US009855813B2

(12) United States Patent
Mohamed

(10) Patent No.: US 9,855,813 B2
(45) Date of Patent: Jan. 2, 2018

(54) SYSTEM AND METHODS FOR PREVENTING WHEEL HOP DURING A BURNOUT EVENT IN A MOTOR VEHICLE

(71) Applicant: FORD GLOBAL TECHNOLOGIES, LLC, Dearborn, MI (US)

(72) Inventor: Ahmed Mohamed, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 17 days.

(21) Appl. No.: 14/560,849

(22) Filed: Dec. 4, 2014

(65) Prior Publication Data
US 2016/0159187 A1    Jun. 9, 2016

(51) Int. Cl.
| B60K 28/16 | (2006.01) |
| B60T 8/1761 | (2006.01) |
| B60G 17/08 | (2006.01) |
| B60G 17/016 | (2006.01) |
| B60T 8/175 | (2006.01) |

(52) U.S. Cl.
CPC ......... B60G 17/08 (2013.01); B60G 17/0164 (2013.01); *B60G 2400/204* (2013.01); *B60G 2400/208* (2013.01); *B60G 2400/252* (2013.01); *B60G 2400/70* (2013.01); *B60G 2400/90* (2013.01); *B60G 2500/10* (2013.01); *B60G 2800/21* (2013.01); *B60K 28/16* (2013.01); *B60T 8/175* (2013.01)

(58) Field of Classification Search
None
See application file for complete search history.

(56) References Cited

U.S. PATENT DOCUMENTS

| 4,805,102 | A * | 2/1989 | Ise ..................... B60G 17/0195 280/5.515 |
| 5,434,782 | A * | 7/1995 | Henry ................ B60G 17/0157 280/5.5 |
| 6,406,103 | B1 | 6/2002 | Elliott |
| 6,428,118 | B1 | 8/2002 | Blosch |
| 7,363,138 | B2 | 4/2008 | Scelers |
| 7,853,389 | B2 * | 12/2010 | Luehrsen ................ B60T 8/175 180/197 |
| 8,140,238 | B2 * | 3/2012 | Luehrsen ................ B60T 8/175 180/197 |
| 8,175,785 | B2 | 5/2012 | Turski |
| 8,244,445 | B2 * | 8/2012 | Luehrsen ................ B60K 28/16 180/197 |
| 8,297,717 | B2 | 10/2012 | Mlynarczyk |

(Continued)

FOREIGN PATENT DOCUMENTS

| CN | 102658765 A | 9/2012 |
| CN | 202806241 U | 3/2013 |
| WO | WO2015153811 A1 * | 10/2015 |

*Primary Examiner* — Thomas G Black
*Assistant Examiner* — Demetra Smith-Stewart
(74) *Attorney, Agent, or Firm* — Jones Robb, PLLC; Raymond L. Coppiellie

(57) ABSTRACT

Systems and methods for stabilizing a vehicle during a traction control event are disclosed. Signals indicative of wheel speed and velocity of the vehicle may be received at a controller of the vehicle and compared to determine wheel slip. Based on the wheel slip, the controller determines whether a burnout condition exists. A damping force of at least one damper associated with a suspension of the vehicle may be adjusted when a burnout condition is detected.

20 Claims, 4 Drawing Sheets

(56) References Cited

U.S. PATENT DOCUMENTS

| | | |
|---|---|---|
| 8,706,378 B2 | 4/2014 | Choby |
| 8,825,336 B2 * | 9/2014 | Sollart ................... B60K 28/16 701/82 |
| 2003/0065435 A1 * | 4/2003 | Krueger ................. B60K 28/16 701/82 |
| 2004/0015279 A1 * | 1/2004 | Barron ................. B60G 17/015 701/37 |
| 2005/0080547 A1 * | 4/2005 | Scelers ................. B60K 28/16 701/82 |
| 2005/0283298 A1 * | 12/2005 | Ochi ..................... B60W 10/02 701/67 |
| 2008/0319623 A1 * | 12/2008 | Dobkin ................. B60W 30/20 701/70 |
| 2009/0107748 A1 * | 4/2009 | Luehrsen ............... B60K 28/16 180/197 |
| 2009/0112437 A1 * | 4/2009 | Luehrsen ................ B60T 8/175 701/84 |
| 2011/0172889 A1 * | 7/2011 | Zhang ................... B60K 23/06 701/54 |
| 2013/0073166 A1 * | 3/2013 | Sollart ................... B60K 28/16 701/84 |
| 2014/0129107 A1 | 5/2014 | Taylor |

\* cited by examiner

SYSTEM AND METHODS FOR PREVENTING WHEEL HOP DURING A BURNOUT EVENT IN A MOTOR VEHICLE

TECHNICAL FIELD

The present disclosure relates generally to systems and methods for controlling the damping force in a vehicle suspension system during a burnout event. More specifically, the present disclosure relates to systems and method for automatically detecting a burnout state during which driven wheels of a motor vehicle are caused to spin and preventing wheel hop during the burnout event.

BACKGROUND

Vehicle suspension dampers, or shock absorbers, of a vehicle's suspension system are used to limit the oscillatory behavior of a vehicle's wheels or body. Dampers can lose their effectiveness, for example, at extreme temperatures due to a change in viscosity of the hydraulic fluid passing through the dampers. This may occur, for example, during burnouts, as the temperature of the spinning tires increases at high rates due to friction. In some instances, changes in the viscosity of the hydraulic fluid passing through dampers may cause the motion of the vehicle to change toward an undamped, or oscillatory motion which results in, for example, increased tire wear, increased suspension wear, and overall degraded vehicle handling.

In modern vehicle's, when a driven wheel of the vehicle is caused to spin by a vehicle operator, in particular over a longer period of time (e.g., burnout event), increased wear on the driveline between the engine and the driven wheel may occur. This may result in wheel hop in the driveline of the vehicle during the burnout event. Wheel hop occurs when the driven wheels of the vehicle's suspension system are caused to oscillate torsionally, producing vertical and angular displacements in the vehicle, that is, the grip of the driven wheels of the vehicle varies between gripping acceleration and wheel spin.

Limiting the movement of the wheel relative to the chassis can prevent or limit wheel hop. It is, therefore, advantageous for vehicle control systems, which enhance vehicle handling and passenger safety, to request an increased damping force of the vehicle's suspension dampers, to compensate for a consistent force capability from the vehicle's suspension dampers during a burnout event to prevent wheel hop. It may be advantageous, therefore, to provide a vehicle damper monitoring system that can automatically monitor vehicle systems to detect burnout and control damping force during such events to prevent wheel hop. It may be further advantageous to provide vehicle damper monitoring systems and methods which use existing vehicle sensors for this purpose.

SUMMARY

In accordance with various exemplary embodiments, systems and methods for preventing wheel hop during a burnout event are described. In accordance with one aspect of the present disclosure, a method for stabilizing a vehicle during a traction control event comprises receiving signals indicative of wheel speed and vehicle velocity at a controller of the vehicle. A wheel slip of the vehicle is determined based on a comparison of the wheel speed to vehicle velocity. Based on the determined wheel slip, it is determined whether a burnout condition exists. A damping force of at least one damper associated with a suspension of the vehicle is adjusted when a burnout condition is detected.

In accordance with another aspect of the present disclosure, a system for stabilizing a vehicle during a traction control event is provided. The system comprises a controller configured to receive signals indicative of wheel speed and vehicle velocity. The controller is configured to determine a wheel slip of the vehicle based on a comparison of the wheel speed to the vehicle velocity. The controller is configured to determine, based on the wheel slip, whether a burnout condition exists. The controller is configured to adjust a damping force of at least one damper associated with a suspension of the vehicle when the burnout condition is detected.

In accordance with a further aspect of the present disclosure, a vehicle is provided. The vehicle comprises at least one wheel, a wheel speed sensor and a vehicle velocity sensor, at least one damper operatively associated with a suspension system of the vehicle, and a controller. The controller is configured to receive signals indicative of sensed wheel speed and vehicle velocity, and based on the sensed signals, determine whether a burnout condition exists, and adjust a damping force of the at least one damper when a burnout condition is determined.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure, as claimed.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
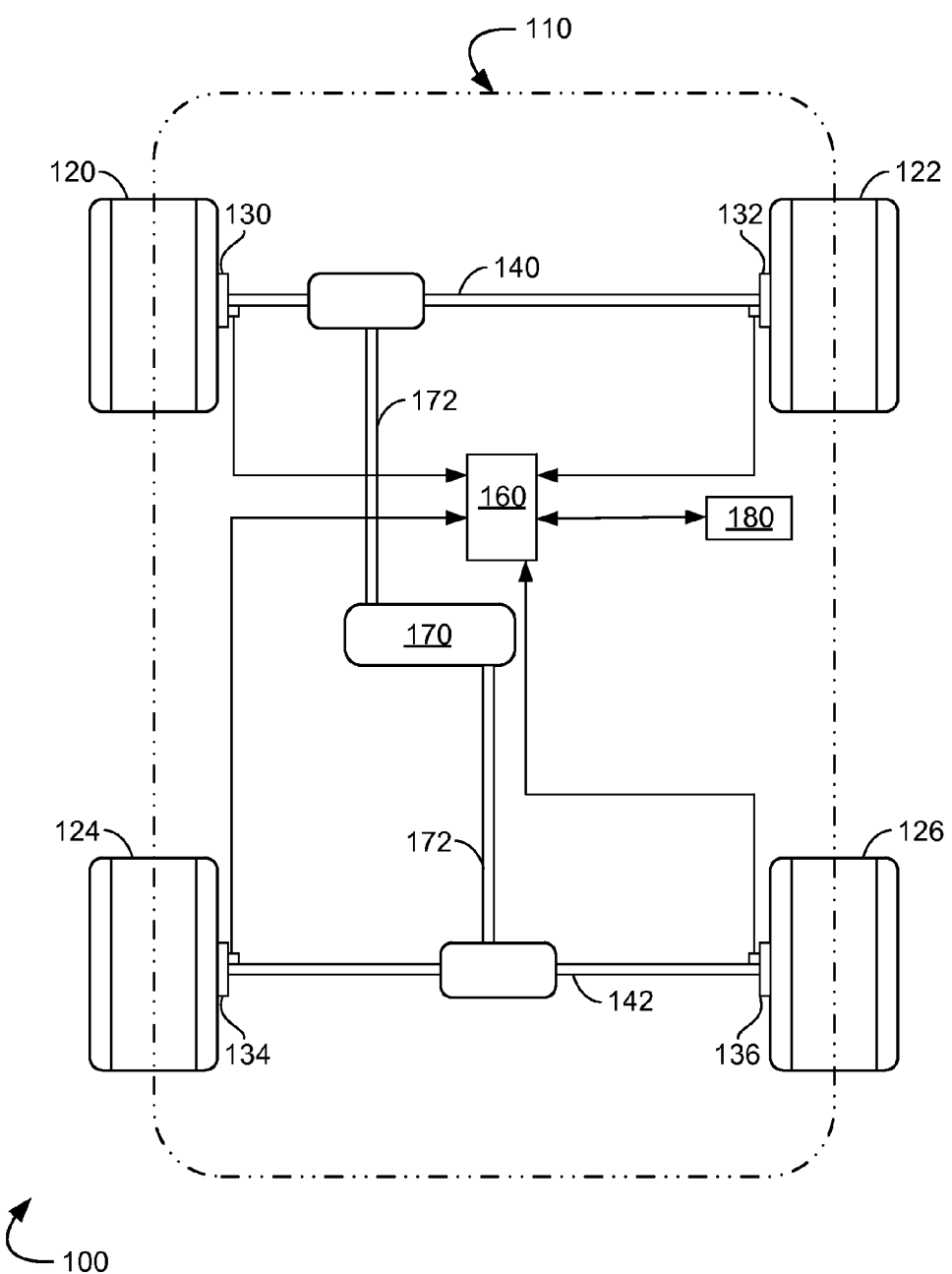
FIG. 1 is a schematic diagram illustrating some structural elements of an exemplary embodiment of a vehicle damper monitoring system for preventing wheel hop during a burnout event in a motor vehicle in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates systems and methods for automatically detecting a burnout condition in a motor vehicle when the vehicle's wheels are caused to spin by identifying a dynamic condition of rear wheel slip (when comparing real wheel speed to vehicle velocity) and an axle torque level that exceeds a threshold. Once the dynamic conditions of rear wheel slip and axle torque are detected, a counter may count-up to a threshold when the burnout condition is satisfied, and count-down to a threshold when the burnout conditions are not satisfied. A controller is notified that a burnout condition has been detected when the counter exceeds a predetermined threshold. When the burnout condition is detected, the system requests an increased damping force be applied by the vehicle's suspension dampers to prevent wheel hop during a burnout event. Application of increased or higher damping force reduces oscillatory motion of the respective wheel(s) to which the damper(s) are attached.

For example, to determine if each of the vehicle suspension dampers is effective in providing the necessary force to reduce oscillatory motion of the respective wheel to which it is attached, the controller may be configured to calculate an amplitude and a frequency for each of the vehicle's wheels based on signals received from sensors. In various exemplary embodiments, the controller may be configured to compare a calculated amplitude for each of the wheels with a threshold amplitude, and compare the calculated frequency for each of the wheels with a "body natural frequency" or "BNF" of the vehicle and a "wheel hop natural frequency" or "WHNF" of the wheels. In this manner, exemplary embodiments of the present disclosure may utilize the dynamic motion of the vehicle's wheels, axle torque, and tire air temperature to continuously monitor and evaluate for rear wheel slip and axle torque (indicating a burnout condition when the vehicle is stationary and tires spin), the damper temperature state of the vehicle suspension dampers, and the resultant damper force at different temperatures as the vehicle is driven. Various vehicle sensors are used to continuously monitor for a burnout condition and determine the effectiveness of the vehicle's suspension dampers in preventing wheel hop during a burnout event. When a burnout is detected, the system requests an increased damping force for the vehicle's suspension dampers to prevent wheel hop during the burnout event by reducing oscillatory motion of the respective wheel to which the vehicle suspension damper is attached.

As used herein, the term "body natural frequency" or "BNF" refers to the natural oscillation frequency of the body of the vehicle itself based on mass, spring stiffness, and geometry of the body removed, for example, from the rest of the vehicle components. In other words, the BNF refers to the oscillation frequency that would be exhibited by the body of the vehicle if the wheels of the vehicle were, for example, attached to the ground and unable to move. In accordance with various embodiments of the present disclosure, for example, automotive vehicles, such as, for example, cars, trucks, and/or buses, generally have a BNF of about 0.8 hertz to about 1.5 hertz.

As will be understood by those of ordinary skill in the art, a change in the mass of the vehicle will necessarily result in a change in the BNF of the vehicle. Thus, as used herein the term "adjusted body natural frequency" or "ABNF" refers to the adjusted natural oscillation frequency of the body of the vehicle which accounts for the increased body mass of a vehicle that is carrying, for example, a driver, passengers, and/or cargo.

As used herein the term "wheel hop natural frequency" or "WHNF" refers to the natural frequency of wheel motion relative to the sprung mass of the vehicle (i.e., the mass of the body and other components of the vehicle that are supported by the vehicle's suspension system). In other words, the WHNF refers to the natural oscillation frequency of the wheels (i.e., the frequency at which the wheels will bounce up and down) based, for example, on the stiffness of the tires and springs and the unsprung weight of the suspension (i.e., the weight of the suspension components that are not supported by a spring), relative to the mass of the rest of the vehicle. In accordance with various embodiments of the present disclosure, for example, automotive vehicles, such as, for example, cars trucks, and/or buses generally have a wheel hop natural frequency of about 9 hertz to about 15 hertz.

FIG. 1 is a schematic diagram illustrating some structural elements of an exemplary embodiment of a vehicle damper monitoring system 100 for preventing wheel hop during a burnout event in accordance with the present disclosure. As illustrated in FIG. 1, a vehicle 110 may have wheel and tire assemblies 120, 122, 124, 126 with respective suspension dampers 130, 132, 134, 136. Front wheel 120 and damper 130 are mounted on the left side (LF) of front axle 140 and front wheel 122 and damper 132 are mounted on the right side (RF) of the front axle 140. Rear wheel 124 and damper 134 are mounted on the left side (LR) of rear axle 142 and rear wheel 126 and damper 136 are mounted on the right side (RR) of rear axle 142. Although disclosed herein as primarily a damper associated with each wheel, it is contemplated that alternative damping systems, such as, for example, those associated with each axle, may be used.

A drive system 170 coupled to a drivetrain 172 may provide power to the wheel and tire assemblies 120, 122, 124, 126 through, for example, differentials (not shown). The drive system 170 may include an engine controller (not shown) and a powertrain (not shown). The drive system 170 via the engine controller and powertrain may control the amount of torque and slip generated at each of the wheel and tire assemblies 120, 122, 124, 126 and vary the amount of power output to change the torque at the wheel and tire assemblies 120, 122, 124, 126.

The system 100 includes sensors (not shown) to maintain various conditions and systems of the vehicle and at least one controller 160 configured to receive signals transmitted from each of the sensors. The sensors may be sensors that exist in conventional vehicles or may comprise system specific sensors to maintain various conditions and systems of the vehicle. For example, in various exemplary embodiments, as illustrated in FIG. 1, the sensors (not shown) may be associated with the wheel and tire assemblies 120, 122, 124, 126, the suspension dampers 130, 132, 134, 136, the vehicle body (not shown), and/or a vehicle engine (not shown), etc. As will be understood by those of ordinary skill in the art, each sensor may be mounted with respect to a respective wheel and tire assembly 120, 122, 124, 126.

Additionally, although not shown, various dynamic sensors may be coupled to a traction control system 180. These dynamic sensors may include, for example, a lateral acceleration sensor, a longitudinal acceleration sensor, a heave acceleration sensor, and a roll rate sensor. Each of the sensors may be used to continuously measure the relative position of the wheel and tire assemblies 120, 122, 124, 126 with respect to the vehicle body (not shown). The controller monitors the amount of axle torque requested and determines the wheel slip generated at each of the wheel and tire assemblies 120, 122, 124, 126.

The controller 160 receives signals from the sensors (not shown) through, for example, a Controller Area Network (CAN) or private bus, and uses the received signals to detect a burnout condition and to continuously calculate and request the damping force of each of the suspension dampers 130, 132, 134, 136.

Although not shown, in various exemplary embodiments, the system 100 may include a line lock feature. The line lock feature may allow front brakes of the front wheel and tire assemblies 120, 122 to lock independently from the rear brakes of the rear wheel and tire assemblies 124, 126 via a switching mechanism. The line lock feature may be an electric solenoid that controls a valve placed on a front brake line of the vehicle 110. The switching mechanism may be controlled automatically by the controller 160 and/or manually by a driver.

Those of ordinary skill in the art will understand that the vehicle damper monitoring system 100 illustrated in FIG. 1 is exemplary only and intended to illustrate one embodiment of the present disclosure. Accordingly, vehicle damper monitoring systems for preventing wheel hop during a burnout event in accordance with the present disclosure may have various types, numbers and/or configurations of wheels, dampers, controllers, and/or sensors without departing from the scope of the present disclosure and claims.

Figure 2:
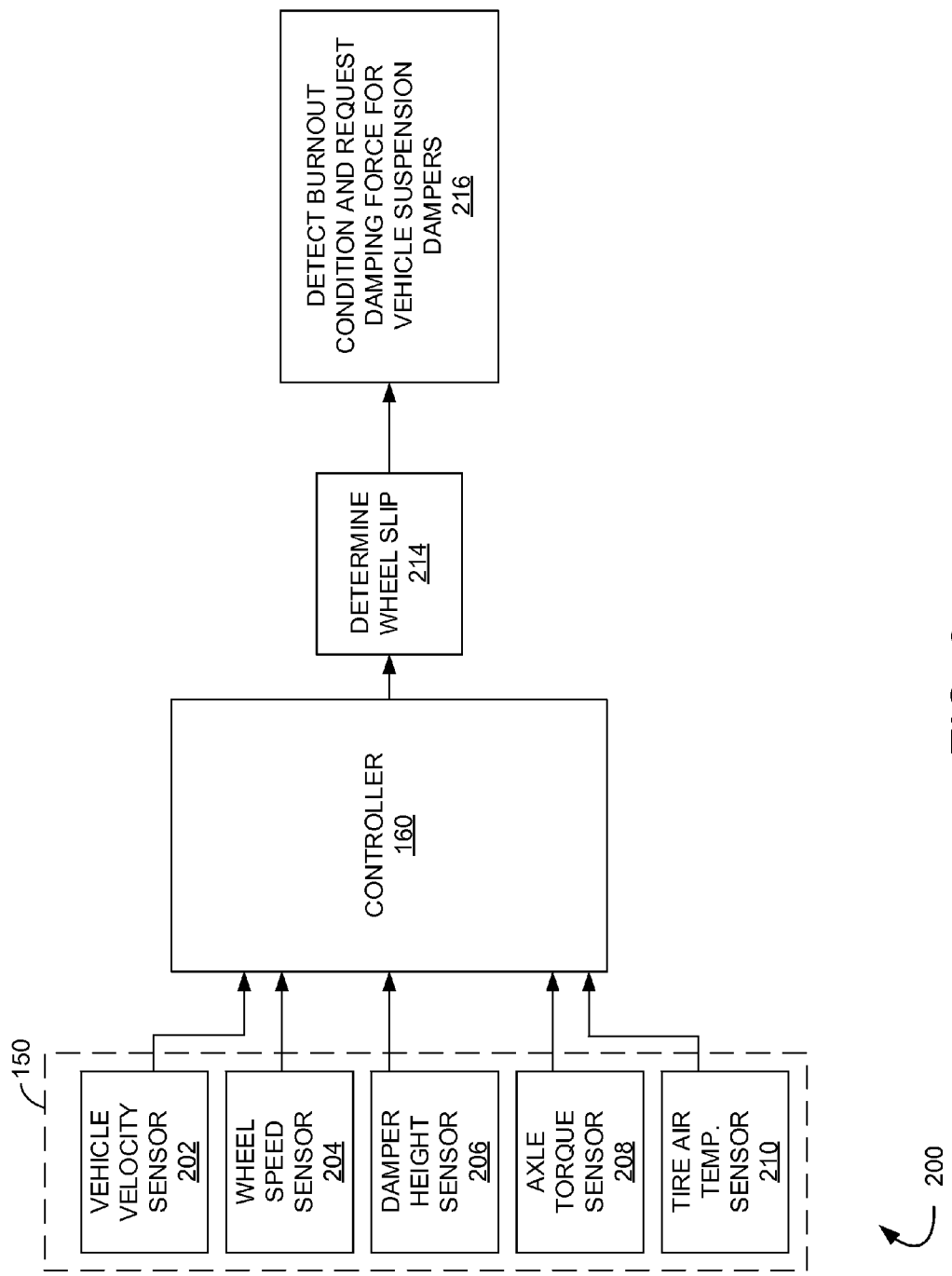
FIG. 2 is a block diagram depicting an exemplary embodiment of a method of preventing wheel hop during a burnout event in a motor vehicle in accordance with the present disclosure.
Figure 3:
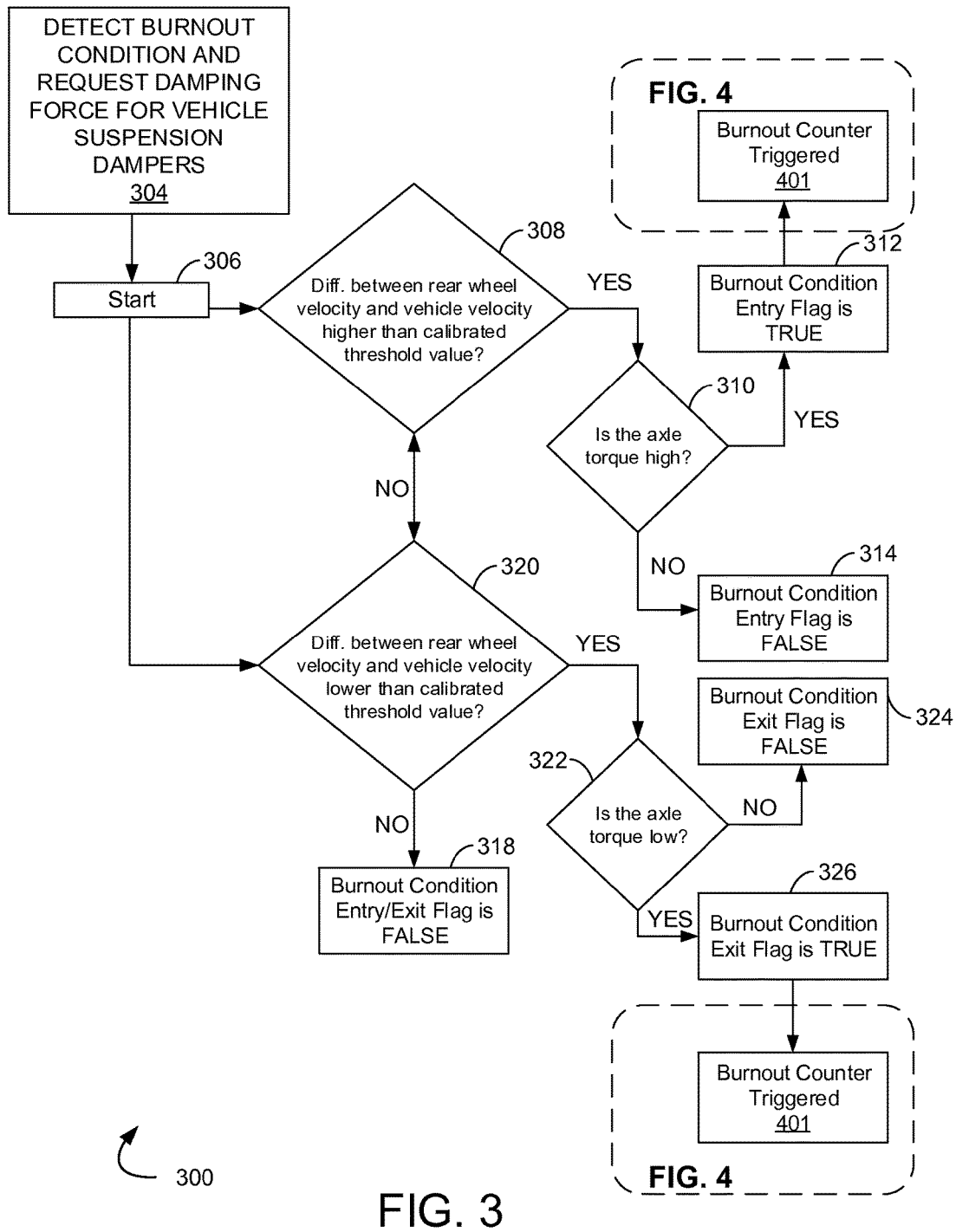
FIG. 3 is a flow diagram depicting an exemplary embodiment of a method of preventing wheel hop during a burnout event in a motor vehicle in accordance with the present disclosure.
Figure 4:
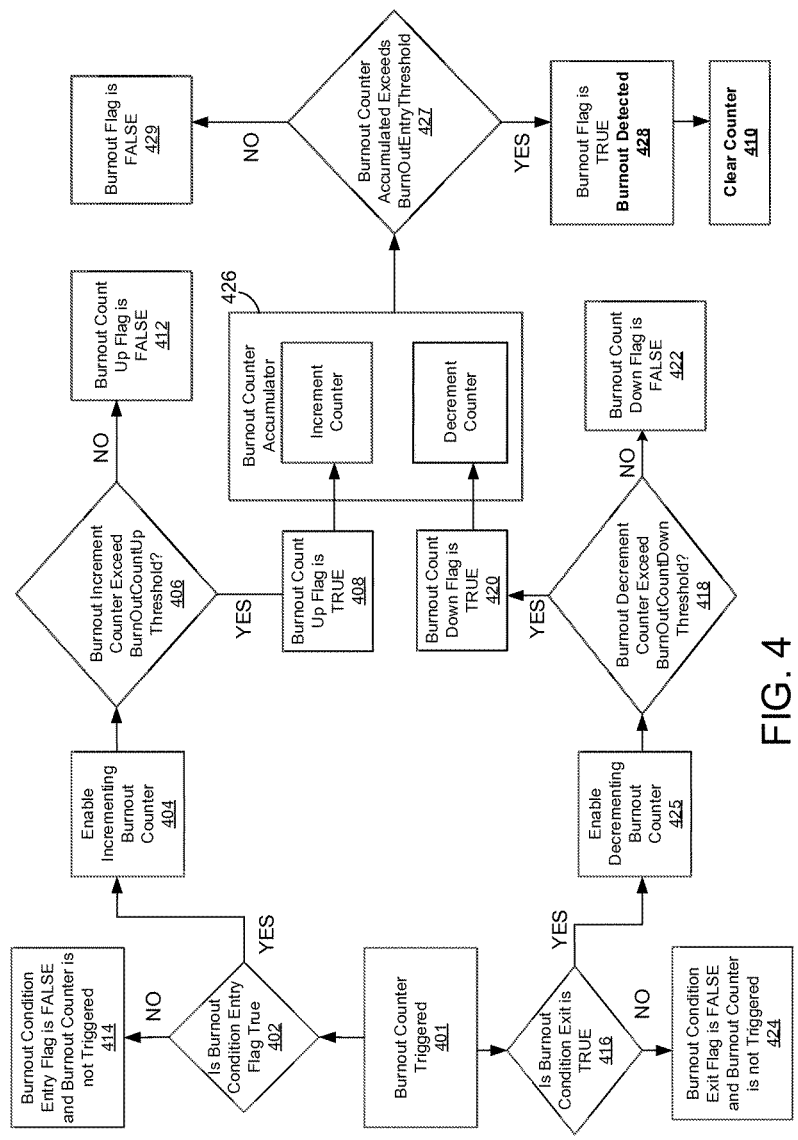
FIG. 4 is a flow diagram depicting an exemplary embodiment of a method of preventing wheel hop during a burnout event in a motor vehicle in accordance with the present disclosure.

FIGS. 2-4 illustrate flow diagrams depicting portions 200, 300, 400 of an exemplary embodiment of a method for preventing wheel hop during a burnout event in accordance with the present disclosure. The method may be implemented in the vehicle monitoring system illustrated in FIG. 1 or with any suitable vehicle monitoring system. The method may be implemented by controller 160 or distributed throughout the vehicle via various other controllers (not shown). In addition, although FIGS. 2-4 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIGS. 2-4, controller 160 receives signals from the vehicle velocity sensors 202, wheel speed sensors 204, damper height sensors 206, axle torque sensors 208, and tire air temperature sensors 210. Based on these signals, the controller 160 determines whether or not the damping force at a given sensor is at a level that will prevent wheel hop and it requests an increased damping force to prevent wheel hop during a detected burnout event, as set forth in the following embodiments. In one exemplary embodiment, detection of the burnout event may result in an increase to the requested damping force to, for example, 1500-3000 Newton Meter (N·m). These values are calibratable and actual forces depend on features, such as, for example, the size and type of the damper, the weight and type of the vehicle, and/or the sprung mass of the vehicle. Additionally or alternatively, as will be understood by those of skill in the art, it would be possible to switch between a damping and no damping situation. For example, in one exemplary embodiment, the controller 160 only requests an increase in damping force when needed, thus, the damping force requested for a standstill vehicle is zero. As the vehicle accelerates from standstill, the vehicle experiences, for example, rough road surfaces, rough maneuvers, and, in this case, the detected burnout event. In response to the detected burnout event, the controller 160 requests an increased damping force to decrease noise and vibrations in the vehicle caused by wheel hop. The controller 160 may include, for example, an existing vehicle controller such as the Electronic Control Unit (ECU) of the vehicle (illustrated in FIG. 1), or a dedicated controller, or control may be distributed among more than one vehicle controller, as will be understood by one ordinarily skilled in the art.

In various exemplary embodiments, illustrated in FIGS. 2-4, the controller 160 may receive signals from the sensors 202, 204, 206, 208, 210 over a specified period of time (e.g., a sample time) and calculate a difference between a sensed wheel speed and vehicle velocity (e.g., sensed by vehicle velocity sensor 202 and wheel speed sensor 204), calculate an amplitude and WHNF for each of the wheel and tire assemblies (illustrated in FIG. 1) to detect an oscillatory event (e.g., sensed by the damper height sensor 206), calculate a twist angle and torque in the axle (e.g., the torque may be sensed by axle torque sensor 208 and used to calculate the twist angle), and estimate a tire tread temperature (e.g., sensed by tire air temperature sensor 210). Alternatively, these calculations and monitoring may be done continuously.

Referring to FIG. 2, to determine if a tire burnout condition exists, in various exemplary embodiments, the controller 160 may first identify the high rear wheel slip. For example, maximum traction occurs when the wheel and tire assemblies of the vehicle rotate at an angular velocity such that the actual peripheral speed is slightly higher or slightly lower than the true vehicle speed (e.g., the linear speed at which the vehicle 110, illustrated in FIG. 1, is traveling). The difference between the wheel speed and true vehicle speed is the "slip speed." When traction is reduced or lost, some or all of the vehicle's wheel and tire assemblies may slip. This may cause accelerated wheel or brake wear, high mechanical stresses in the drivetrain, and an undesirable decrease of tractive (or braking) effort. The differential speeds between the front axle-wheel set (e.g., wheel and tire assemblies 120, 122 and front axle 140 illustrated in FIG. 1) and the rear axle-wheel set (e.g., wheel and tire assemblies 124, 126 and rear axle 140 illustrated in FIG. 1) or the rate of change of wheel speed (sensed by wheel speed sensor 204) or the combination of these may be used to detect wheel slip 214 and, subsequently, a burnout condition 216.

The controller 160 monitors the vehicle speed and wheel speed to determine whether the sensed wheel slip velocity equals or exceeds a predetermined calibration value threshold, e.g., a function of the calculated twist angle and torque in the axle (e.g., the torque may be sensed by axle torque sensor 208 and used to calculate the twist angle) and vehicle velocity (e.g., sensed vehicle velocity sensor 202). If the sensed wheel slip velocity is outside the calibration value threshold, then the controller 160 flags the wheel and tire assemblies. For example, in an exemplary embodiment, the controller 160 continuously monitors the wheel slip velocity and the vehicle velocity. The controller 160 may flag the wheel and tire assemblies as TRUE or FALSE. If the wheel and tire assemblies are flagged as, for example, TRUE and remain TRUE for an extended period of time (determined by the calibration value threshold), then the flag is an indicator of a burnout event.

Referring to FIG. 3, which illustrates an exemplary embodiment of a portion of the method for preventing wheel hop during a burnout event in accordance with the present disclosure, at Step 304, a burnout condition may be detected.

For example, at Step 306, the controller 160 receives signals containing values associated with a condition of the vehicle velocity sensor (e.g., values sensed by vehicle velocity sensor 202 illustrated in FIG. 2), the rear wheel speed sensors LR, RR (e.g., values sensed by rear wheel speed sensors 204 illustrated in FIG. 2), the axle torque sensor (e.g., values sensed by axle torque sensor 208 illustrated in FIG. 2), and the tire air temperature sensor (e.g., values sensed by tire air temperature sensor 210 illustrated in FIG. 2) and uses these sensed values to calculate and determine a dynamic condition of high rear wheel slip and a high axle torque (e.g., 1900 N·m at −20° Celsius, 2200 N·m at −10° Celsius, 2500 N·m at 0° Celsius, 2700 N·m at 10° Celsius, 3000 N·m at 20° Celsius, etc., illustrated in Table 1 below).

TABLE I

| Axle Torque | Wheel Velocity Slip (mps) | | | |
|---|---|---|---|---|
| (N · m) | >2.8 mps | <0.5 mps | Entry Flag | Exit Flag |
| High | TRUE | FALSE | TRUE | FALSE |
| High | FALSE | TRUE | FALSE | FALSE |
| Low or normal | TRUE | FALSE | FALSE | FALSE |
| Low or normal | FALSE | TRUE | FALSE | TRUE |

In one exemplary embodiment, for example, the threshold values associated with wheel slip velocity and the vehicle velocity for an ENTRY flag condition is 2.8 meters per second (m/s) or approximately 10 kilometers per hour (kph). The ENTRY flag condition remains TRUE until the wheel slip velocity becomes less than or equal to 2.8 m/s. To determine whether a burnout condition is enabled, the axle torque of the vehicle may be checked against a Tire Air Temperature Lookup Table, which has a tire air temperature input, to determine whether the axle torque is high. This may be accomplished by, for example, inputting the tire air temperature of the vehicle into the lookup able. The tire air temperature may be used to determine a temperature state of the ground, i.e., whether the ground is cold due to rain or ice which may cause a slippery road condition. The tire air temperature and the axle torque of the vehicle are used to determine whether the burnout condition may be enabled. In some temperatures, for example, when the temperature is below 0° Celsius, the vehicle tires may not have sufficient traction with the road. Insufficient traction with the road results in wheel slip when minimal axle torque exists. Alternatively, the burnout condition may be enabled by high axle torque, i.e., when axle torque that is greater than, for example, 3000 N·m in a small vehicle, and a tire air temperature that is approximately 20° Celsius.

At Steps 308, 310, and 312, the controller 160 determines a difference between a sensed rear wheel speed (LR, RR) of the rear wheel and tire assemblies and the sensed velocity of the vehicle. If this difference exceeds the acceptable calibration threshold value range, e.g., "WheelSlipHiBurnOut," and the axle torque of the rear axle is high, e.g., wheel slip is greater than 2.8 mps and axle torque is above 3000 N·m at 20° Celsius, then a burnout condition entry flag will be flagged as TRUE and a burnout counter will be triggered. For example, when the burnout condition entry flag is flagged as TRUE the clock is started (count up). If the burnout condition entry flag is flagged as FALSE, the exit flag will decrement the clock (count down).

At Steps 320, 322, and 326, if the difference between a sensed rear wheel speed (LR, RR) of the rear wheel and tire assemblies and the sensed velocity of the vehicle does not exceed the acceptable calibration threshold value range, e.g., "WheelSlipLoBurnOut," and the axle torque of the rear axle is low, for example, the vehicle velocity is less than a threshold (0.5 m/s or 1.8 kph) and the axle torque is lower than a force value at the sensed temperature (e.g., 1900 N·m at −20° Celsius, 2200 N·m at −10° Celsius, 2500 N·m at 0° Celsius, 2700 N·m at 10° Celsius, 3000 N·m at 20° Celsius, etc.), then the burnout condition exit flag will be flagged as TRUE and a burnout counter will be triggered.

At step 318, if the difference between a sensed rear wheel speed (LR, RR) of the rear wheel and tire assemblies and the sensed velocity of the vehicle is within the acceptable calibration threshold value range, then the burnout condition entry and exit flags will be flagged as FALSE and the burnout counter will not be triggered.

At Steps 314 and 324, if the difference between a sensed rear wheel speed (LR, RR) of the rear wheel speed and tire assemblies and the sensed velocity of the vehicle is outside the acceptable calibration threshold value range and the calculated twist angle and sensed torque in the axle (e.g., the torque may be sensed by axle torque sensor 208) is not high or low but within a nominal axle torque range, then the burnout condition entry and exit flags will be flagged as FALSE and the burnout counter will not be triggered. The calculated twist angle and torque in the axle is dependent on the wheel and tire assemblies and road friction. For example, in a cold temperature, the sensed axle torque in the axle may tend to be lower than the sensed axle torque in a hot temperature. For this reason, the controller, for example, controller 160 illustrated in FIG. 2, may be configured to map the sensed tire air temperature (e.g., sensed by tire air temperature sensor 210) to determine whether the axle torque is high or not due to traction with the road. In an exemplary embodiment, a table relating to and/or mapping sensed tire air temperatures to engine and axle torque that corresponds to a given type of vehicle may be stored in a memory accessible by controller 160. In some instances, hysteresis is used to determine the entry/exit conditions and to prevent rapid state switching. For example, hysteresis may be used to ensure that noise does not factor into the output determination for the entry and exit conditions when the wheel slip velocity is near the threshold.

Referring to FIG. 4, at step 401 a burnout counter is triggered. For example, at step 402, the controller 160, illustrated in FIG. 2, confirms that a burnout condition is detected. At step 402, if a burnout condition entry flag is flagged as TRUE, as previously noted in step 312 of FIG. 3, then a burnout incrementing counter is enabled at step 404. The burnout incrementing counter is incremented by one step or count every 100 milliseconds (ms) until the burnout counter exceeds a BurnoutEntryThreshold, e.g., a count of 20, at step 406. If the burnout counter does not exceed the BurnoutEntryThreshold, e.g., a count of 20, at step 406 then the burnout count up flag, e.g., the burnout condition entry flag flagged as TRUE at step 402, is FALSE at step 412. If a burnout condition exit flag is flagged as TRUE at step 416, then a burnout decrementing counter is enabled at Step 425. The burnout decrementing counter is decremented by one step or count every 400 ms until the burnout counter exceeds a BurnoutCountDownThreshold, e.g., a count of 20, at step 418. If the burnout counter does not exceed the Burnout- CountDownThreshold at step 418 then the burnout count down flag, e.g., the burnout condition exit flag is flagged as TRUE at step 416, is FALSE at step 422. Note that the values, e.g., 100 ms and 400 ms, for incrementing and decrementing the counter are exemplary only. These values are intended to be calibratable based on how fast an operator wants to detect a burnout condition or exit a burnout event. The BurnoutEntryThreshold and the BurnoutCountDownThreshold are calibratable and the count of 20 is exemplary only.

In an exemplary embodiment, the burnout counter, via the controller 160, may run at a subsystem loop rate that increments the burnout counter per step e.g., incremented by one count every 100 ms or decremented by one count every 400 ms. If the burnout condition entry flag is flagged as TRUE, the controller 160 may increment the burnout accumulator by an increment of one count every 100 ms. At step 406, if the burnout counter exceeds an accumulator threshold value (for example, 100 ms if the entry flag is flagged as TRUE) e.g., BurnOutCountUp, then the burnout count up flag is flagged as TRUE at Step 408 and will increment the accumulator counter at Step 426. At step 427 if the burnout counts accumulated at step 426 exceeds the BurnoutEntryThreshold, e.g., a count of 20, then the burnout flag is flagged as TRUE (e.g., burnout condition has been detected) at step 428 and the burnout counter is cleared at Step 410. If the burnout incrementing counter does not exceed the accumulator threshold value BurnoutEntryThreshold, e.g., if the burnout counts accumulated at step 426 does not exceed a count of 20, then the burnout flag is flagged as FALSE at step 429 (e.g., burnout condition has not been detected) and the burnout counter is not cleared.

In another exemplary embodiment, at Step 414, the burnout condition entry flag is flagged as FALSE and a burnout counter is not enabled. At step 424 the burnout condition entry flag is flagged as FALSE and the burnout counter is not enabled. For example, the entry flag may be flagged as TRUE at step 402. The burnout counter, which may be calibrated depending on the type of vehicle, is enabled at step 404 and may increment one count every 100 ms at step 406. These increments, e.g., one count or step every 100 ms, are based on multiple layers of calculations performed on the sensed signals at the controller 160. The burnout counter will reset when the entry flag condition is FALSE at step 414 or if the controller 160 has initialized.

In another exemplary embodiment, when a burnout condition exit flag is flagged as TRUE at step 416 then a burnout decrementing counter is enabled at step 425. The burnout decrementing counter may decrement one count every 400 ms at step 418. These decrements, e.g., one count or step every 400 ms, are based on multiple layers of calculations performed on the sensed signals at the controller 160. The burnout decrementing counter will reset when the exit flag is FALSE at step 424 or if the controller 160 is initialized. For example, the burnout decrementing counter via the controller 160 may run at a subsystem loop rate that increments the burnout counters per step. If the burnout condition exit flag is flagged as TRUE, the controller 160 will enable the decrementing burnout counter at Step 425. At step 418, if the burnout decrement counter exceeds an accumulator threshold value, e.g., BurnOutCountDown, then the burnout count down flag is flagged as TRUE at Step 420 and will decrement the burnout counter accumulator at Step 426. At step 427 if the burnout counts accumulated at step 426 exceeds the BurnOutEntryThreshold, e.g., a count of 20, then the burnout flag is flagged as TRUE (e.g., burnout condition has been detected) at step 428 and the burnout counter is cleared at step 410. At step 418, if the burnout decrementing counter does not exceed the accumulator threshold value, e.g., BurnOutEntryThreshold, e.g., a count of 20, then the burnout count down flag is flagged as FALSE at step 429 (e.g., burnout condition has not been detected) and the burnout counter is not cleared.

In an exemplary embodiment, to detect a burnout event, the entry condition, e.g., BurnoutConditionEntry_TRUE, must be faster than the exit condition, e.g., BurnoutConditionExit_TRUE, for example, the entry flag counter must increment one count every 100 ms which is faster than decrements of the exit flag counter by one count every 400 ms. Consequently, the BurnOutCountUp threshold value is smaller than the BurnOutCountDown threshold value.

Note: If Steps 408 and 420 are not both TRUE, then the burnout accumulator maintains the last stored value for the counter at the controller 160.

Once a burnout condition is detected and confirmed, the controller 160 sends a current request to a solenoid valve of the suspension dampers (illustrated in FIG. 1) to vary an orifice in each of the suspension dampers to allow for more or less damping. For example, the controller 160 can determine a requested damping force of the suspension dampers using signals of heave accelerations, pitch accelerations and roll accelerations (measured by inertial moment unit—not shown). The requested damping force of the suspension dampers can be converted to current force. The controller 160 may adjust the damping force level of the suspension dampers to increase, for example, the damping force on the rear wheel and tire assemblies (LR, RR) and to decrease the damping force on the front wheel and tire assemblies (LF, RF). Such an adjustment will prevent wheel hop during a burnout event.

In another exemplary embodiment, the controller 160 may activate a line lock (not shown) positioned, for example, near the rear wheel and tire assemblies on the vehicle so that the rear wheel and tire assemblies may spin freely to perform a burnout without driver input. In this manner, the brake system (not shown) of the vehicle may be protected.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for stabilizing a vehicle during a traction control event, the method comprising:
   receiving signals indicative of wheel speed and vehicle velocity at a controller of the vehicle;
   determining a wheel slip of the vehicle based on a comparison of the wheel speed to the vehicle velocity;
   determining, based on the wheel slip, whether a burnout condition exists;
   incrementing a counter when a burnout condition exists; and
   adjusting a damping force of at least one damper associated with a suspension of the vehicle when the burnout condition exists and the counter exceeds a threshold.

2. The method of claim 1, further comprising receiving a signal from an axle torque sensor, wherein the controller calculates a twist angle of the axle based on the received axle torque signal.

3. The method of claim 2, wherein the signal indicative of wheel speed is received from a rear sensor of a rear wheel tire assembly of the vehicle.

4. The method of claim 1, further comprising:
   determining a calibration threshold value,
   wherein adjusting the damping force of the at least one damper associated with the suspension of the vehicle includes adjusting the damping force when the wheel speed equals or exceeds the calibration threshold value.

5. The method of claim 1, further comprising identifying a condition of high rear wheel slip and high axle torque based on the compared wheel speed and velocity.

6. The method of claim 1, wherein the threshold is an accumulator threshold, and further comprising:
   determining the accumulator threshold; and
   running the counter at a subsystem loop rate that increments a burnout accumulator per step when the burnout condition exists,
   wherein adjusting the damping force of the at least one damper associated with the suspension of the vehicle further includes adjusting the damping force when the burnout accumulator exceeds the accumulator threshold.

7. The method of claim 6, further comprising increasing or decreasing the step by an increment of one during each cycle.

8. The method of claim 7, further comprising clearing the counter when the burnout accumulator exceeds the accumulator threshold.

9. A system for stabilizing a vehicle during a traction control event, the system comprising:
   a controller configured to:
   receive signals indicative of wheel speed and vehicle velocity;
   determine a wheel slip of the vehicle based on a comparison of the wheel speed to the vehicle velocity;
   determine, based on the wheel slip, whether a burnout condition exists;
   increment a counter when a burnout condition exists; and
   adjust a damping force of at least one damper associated with a suspension of the vehicle when the burnout condition exists and the counter exceeds a threshold.

10. The system of claim 9, wherein the controller is further configured to:
    receive a signal from an axle torque sensor, wherein a twist angle of the axle is calculated based on the received axle torque signal.

11. The system of claim 10, wherein the signal indicative of wheel speed is received from a rear sensor of a rear wheel tire assembly of the vehicle.

12. The system of claim 11, wherein the threshold is a calibration threshold, and where the controller is configured to:
    determine a calibration threshold value,
    wherein the damping force of the at least one suspension damper of the vehicle is adjusted when the wheel speed equals or exceeds the calibration threshold value.

13. The system of claim 9, further comprising identifying a condition of high rear wheel slip and high axle torque based on the compared wheel speed and vehicle velocity.

14. The system of claim 9, wherein the threshold is an accumulator threshold and the controller is further configured to:
    determine the accumulator threshold; and
    run the counter at a subsystem loop rate that increments a burnout accumulator per step when the burnout condition exists,
    wherein adjusting the damping force of the at least one damper associated with the suspension of the vehicle further includes adjusting the damping force when the burnout accumulator exceeds the accumulator threshold.

15. The system of claim 14, further comprising increasing or decreasing the step by an increment of one during each cycle.

16. The system of claim 14, further comprising clearing the counter when the burnout accumulator exceeds the accumulator threshold.

17. A vehicle, comprising:
    at least one wheel;
    a wheel speed sensor and a vehicle velocity sensor;

at least one damper operatively associated with a suspension system of the vehicle; and a controller, the controller being configured to:
receive signals indicative of sensed wheel speed and vehicle velocity;
based on the received signals, determine whether a burnout condition exists;
run a counter until a count of the counter exceeds a calibratable threshold when a burnout condition exists; and
adjust a damping force of the at least one damper when the burnout condition exists and the counts of the counter exceed the calibratable threshold.

18. The vehicle of claim 17, wherein the controller is further configured to:
run the counter at a subsystem loop rate that increments the count per step until the counts exceed an accumulator threshold value,
wherein the accumulator threshold value is a calibratable threshold,
wherein adjusting the damping force of the at least one damper further includes adjusting the damping force when the counts exceed the accumulator threshold value.

19. The vehicle of claim 17, wherein a value of the calibratable threshold is calibratable based on a vehicle operator's desired speed in detecting the burnout condition or exiting a burnout event.

20. A method for stabilizing a vehicle, comprising:
determining a wheel slip of the vehicle;
determining, based on the wheel slip, whether a burnout condition exists; and
when a burnout condition exists:
incrementing a counter, and
adjusting a damping force of a damper associated with a suspension of the vehicle when the counter exceeds a threshold.

* * * * *